(12) United States Patent
Perry et al.

(10) Patent No.: US 11,992,115 B2
(45) Date of Patent: May 28, 2024

(54) COLLAPSIBLE SINGLE POINT HAMMOCK FRAME

(71) Applicant: Denovo Brands, LLC, Bentonville, AR (US)

(72) Inventors: Stephen C. Perry, Bentonville, AR (US); Benjamin A. Diggins, Spring Dale, AR (US)

(73) Assignee: Denovo Brands, LLC, Bentonville, AR (US)

( * ) Notice: Subject to any disclaimer, the term of this patent is extended or adjusted under 35 U.S.C. 154(b) by 195 days.

(21) Appl. No.: 17/125,118

(22) Filed: Dec. 17, 2020

(65) Prior Publication Data

US 2021/0186187 A1 Jun. 24, 2021

Related U.S. Application Data

(60) Provisional application No. 62/949,930, filed on Dec. 18, 2019.

(51) Int. Cl.
| | |
|---|---|
| *A45F 3/24* | (2006.01) |
| *A45F 3/22* | (2006.01) |
| *A45F 3/26* | (2006.01) |
| *A47C 3/025* | (2006.01) |
| *A47C 17/84* | (2006.01) |
| *F16M 11/24* | (2006.01) |
| *B60R 9/06* | (2006.01) |

(52) U.S. Cl.
CPC .................. *A45F 3/24* (2013.01); *A45F 3/22* (2013.01); *A45F 3/26* (2013.01); *A47C 3/0255* (2013.01); *A47C 17/84* (2013.01); *F16M 11/24* (2013.01); *B60R 9/06* (2013.01)

(58) Field of Classification Search
CPC ..... A45F 3/24; A45F 3/22; A45F 3/26; F16M 11/24; A47C 17/84; A47C 3/0255; B60R 9/06
USPC ..... 5/127, 120, 122, 128, 129, 121; 248/156
See application file for complete search history.

(56) References Cited

U.S. PATENT DOCUMENTS

| | | | |
|---|---|---|---|
| 2,382,528 A | 8/1945 | Anderegg | |
| 2,524,499 A | 10/1950 | Weir | |
| 5,673,444 A * | 10/1997 | Middendorf | A45F 3/24 5/120 |
| 6,934,983 B1 * | 8/2005 | Johnston | A45F 3/24 182/135 |

(Continued)

OTHER PUBLICATIONS

How to. . . Make a Free-Standing Hammock Stand; http://www.bushcraftdays.com/how-to-make-a-free-standing-hammock-stand/; p. 7 of 23.

(Continued)

*Primary Examiner* — David R Hare
*Assistant Examiner* — Madison Emanski
(74) *Attorney, Agent, or Firm* — Michael L. Leetzow PLLC (57) ABSTRACT

A hammock frame allows for the connection of one end of a hammock to a structure at the location and the other end to a hammock frame. The attachment of the hammock frame to the structure is non-permanent and does not damage the surface of the structure. The hammock frame is collapsible, allowing it to be easily transported with the hammock. The hammock frame provides the second point of connection for the hammock, allowing it to be used most anywhere.

10 Claims, 11 Drawing Sheets

(56) References Cited

U.S. PATENT DOCUMENTS

| | | | |
|---|---|---|---|
| 7,073,857 B1* | 7/2006 | Bailey | A47C 3/0255 |
| | | | 297/277 |
| 7,735,166 B1 | 6/2010 | Weeks | |
| 10,441,060 B1* | 10/2019 | Pinholster, Jr. | A45F 3/24 |
| 2007/0051858 A1* | 3/2007 | Bailey | A45F 3/26 |
| | | | 248/127 |
| 2019/0082816 A1* | 3/2019 | Nguyen | A47C 17/84 |

OTHER PUBLICATIONS https://www.fiddlecreekfarms.com/store/Scripts/prodview.asp?idProduct=8309; Madera Hammock Stand; 5 pages.

\* cited by examiner

COLLAPSIBLE SINGLE POINT HAMMOCK FRAME

REFERENCE TO RELATED CASE

This application claims priority under 35 U.S.C. § 119 (e) to U.S. provisional application No. 62/949,930 filed on Dec. 18, 2019, the contents of which are hereby incorporated by reference in their entirety.

BACKGROUND OF THE INVENTION

Hammocks require that opposing ends of the hammocks be supported. In the wilderness, as well as in one's own backyard, it is rare that trees are adequately spaced to allow for hammocks to be adequately supported. The trees may be too close together so that the hammocks drag on the ground. Other times, the trees may be too far apart and the user does not have an adequate length of strapping or rope to span the long distances.

There are a number of hammock supports that are made to fit the hammocks. However, these supports are typically not very portable and do not collapse to a size that is easily handled and carried to the camping locations. Even those hammock supports that can be attached to a tree at one end require a number of legs and interconnections at the other end that make them impractical to be transported and assembled with any ease.

Thus, there is a need for a collapsible single point hammock frame so that campers can take a hammock into the woods and not worry about finding two adequate structures on which to hang their hammock.

SUMMARY OF THE INVENTION

The present invention is directed to a non-permanent, collapsible frame for supporting a hammock that includes an overhead bar, at least one vertical support bar, a termination plate attachable to a support structure, the termination plate receiving a portion of the overhead bar, and a base to receive and support a portion of the at least one vertical support bar.

In some embodiments, the overhead bar in the vertical support bar include a plurality of sections.

In some embodiments, the termination plate includes a receiver for one end of the overhead bar, an opening for a hammock suspension device, and an opening for a termination plate suspension device.

In some embodiments, the plurality of sections of the overhead bar or removably attachable to each other and the plurality of sections of the vertical support bar are removably attachable to each other.

In some embodiments, the termination plate includes a receiver for one end of the overhead bar and an opening for a termination plate suspension device, but does not have an opening for a hammock suspension device.

In yet another aspect, there is a non-permanent, collapsible frame for supporting the hammock that includes a termination plate attachable to a support structure, a base having a vertical support bar extending upward from the base, and an overhead bar extending between the termination plate and the vertical support bar, the overhead bar beam removably attachable to the vertical support bar.

In yet another aspect, there is a non-permanent, collapsible frame for supporting a hammock that includes an overhead bar extending between the first end and a second end, a termination plate attachable to a support structure and to receive the first end of the overhead bar, a connection member to receive the second end of the overhead bar, and the first leg and the second leg, the first leg and the second leg attached to engage a second portion of the connection member.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Reference will now be made in detail to the present preferred embodiment(s) of the invention, examples of which are illustrated in the accompanying drawings. Whenever possible, the same reference numerals will be used throughout the drawings to refer to the same or like parts.

A non-permanent, collapsible frame for supporting a hammock 100 is illustrated in FIGS. 1-8. The non-permanent, collapsible frame 100 is generally comprised of four elements. There is the overhead bar 102, the vertical support bar 104, the base 106, and the termination plate 108.

The overhead bar 102 is preferably comprised of three sections, 102a, 102b, and 102c. The three sections 102a, 102b, and 102c are removably attached to one another and therefore collapse to make transportation of the non-permanent, collapsible frame 100 easier and in a more compact fashion. The same is also true with the three other elements. There may be more or fewer sections than the three illustrated in the figures (e.g., two, four, five, etc.) and still fall within the scope of the present invention. The three sections 102a, 102b, and 102c could be connected to one another in a number of ways. For example, one of the sections 102a, 102b, and 102c could have a portion that slides into another of the sections and secured therein with snap button connectors and a pinned connection (a connector with threads is turned to retain the two sections to one another). It is also possible that the sections are telescoping (one section being retained within another of the sections) and a snap button connector retains the two sections in the desired position. The sections could also be a combination of these connections as well. Moreover, each of the sections could have a portion of one or both ends with a smaller diameter or cross section that fits into the end of another section—a necked arrangement. The sections could also be linked to one another with an elastic cord to keep them consolidated and together for easy packing and transport.

The three sections 102a, 102b, and 102c of the overhead bar 102 are illustrated as being circular tubes, but they could take on any cross-section configuration (e.g. round, oval, square, rectangular, etc.).

The second element of the non-permanent, collapsible frame 100 is at least one vertical support bar 104. As with the overhead bar 102, the at least one vertical support bar 104 may also include a plurality of sections 104a, 104b. Again, the at least one vertical support bar 104 may have more or fewer sections and still fall within the scope of the present invention. The plurality of sections 104a, 104b may also be connected to one another in any of the ways noted above for the overhead bar 102. For example, they could have a sliding relationship and snap button connectors, a pinned connection, or a telescoping connection and a snap button connector. They may also have a necked arrangement and/or be linked to one another with an elastic cord.

The vertical support bar 104 is illustrated as being an elongated tube with a square cross section but it could take on any cross-section configuration (e.g. round, oval, square, rectangular, etc.). The vertical support bar 104 engages and is removably connected to a base 106. The base 106 has a coordinating configuration, which in this case is a square receiver 110, to receive one end of the vertical support bar 104. The vertical support bar 104 may be inserted to an opening or cavity 112 in the square receiver 110. Alternatively, the square receiver 110 can be inserted into the vertical support bar 104. There can be a pinned connection for the square receiver 110 and the vertical support bar 104. See FIGS. 1-3. It is also possible to use bolts to secure the various pieces to one another as well.

Figure 8:
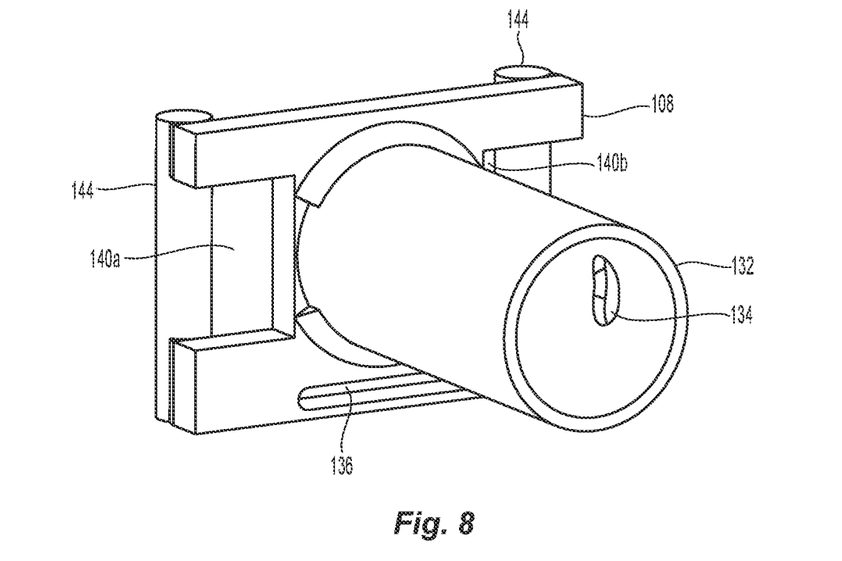
FIG. 8 is a front perspective view of the of the termination plate of the non-permanent, collapsible frame in FIG. 1.
Figure 9:
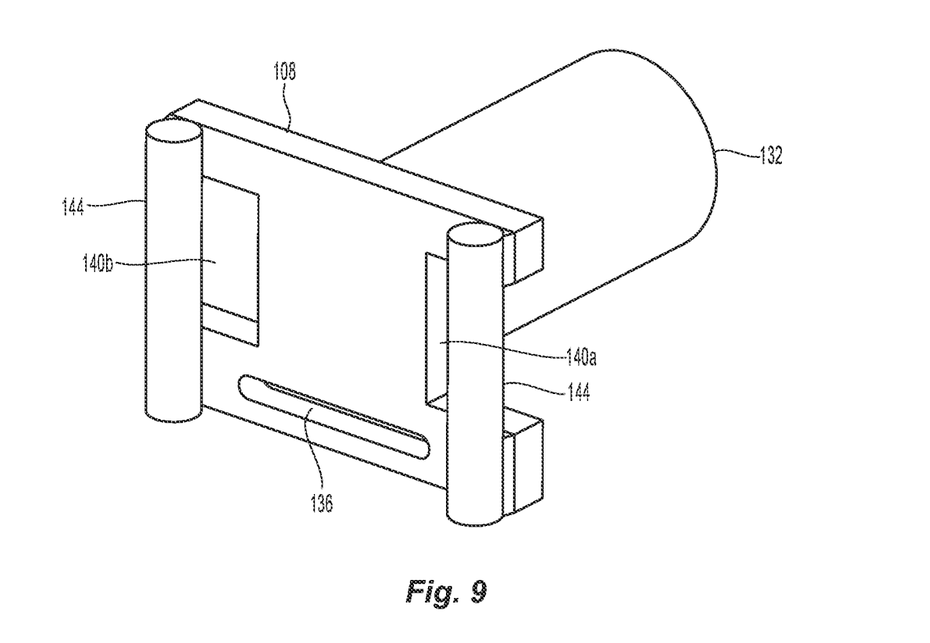
FIG. 9 is a rear perspective view of the of the termination plate of the non-permanent, collapsible frame in FIG. 1.
Figure 10:
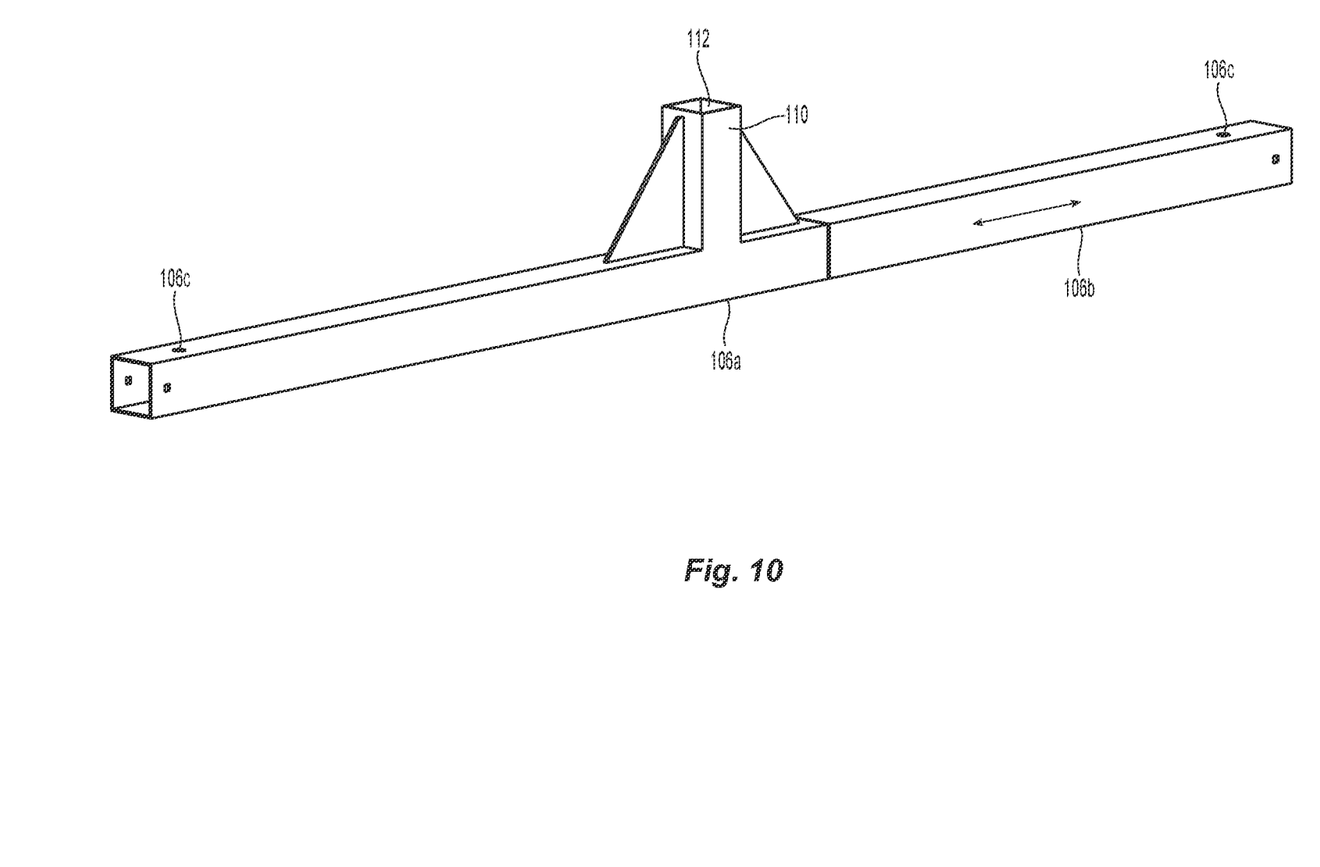
FIG. 10 is a perspective view of the base of the non-permanent, collapsible frame in FIG. 1.
Figure 11:
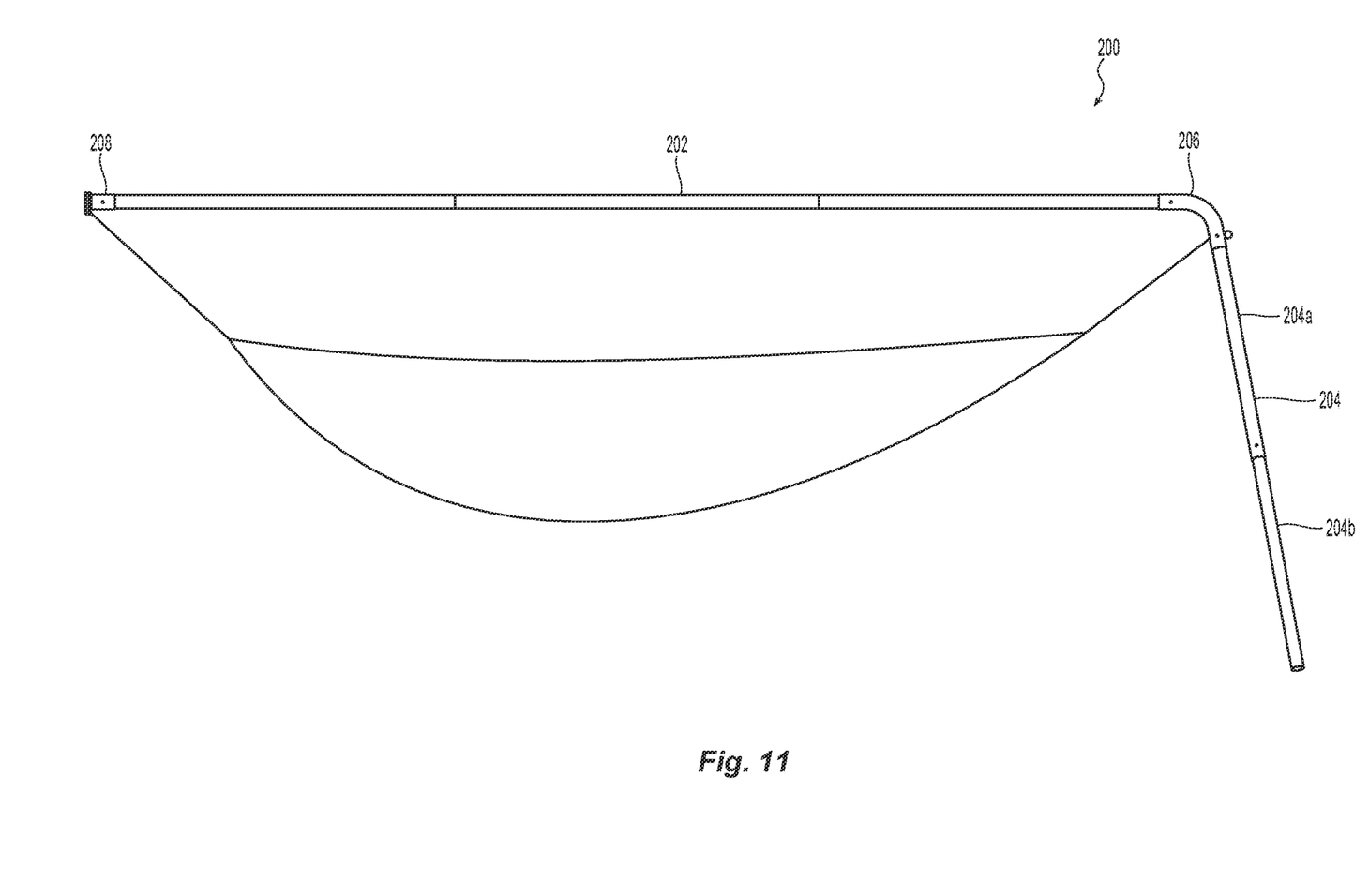
FIG. 11 is a side view of a second embodiment of a non-permanent, collapsible frame according to the present invention.
Figure 12:
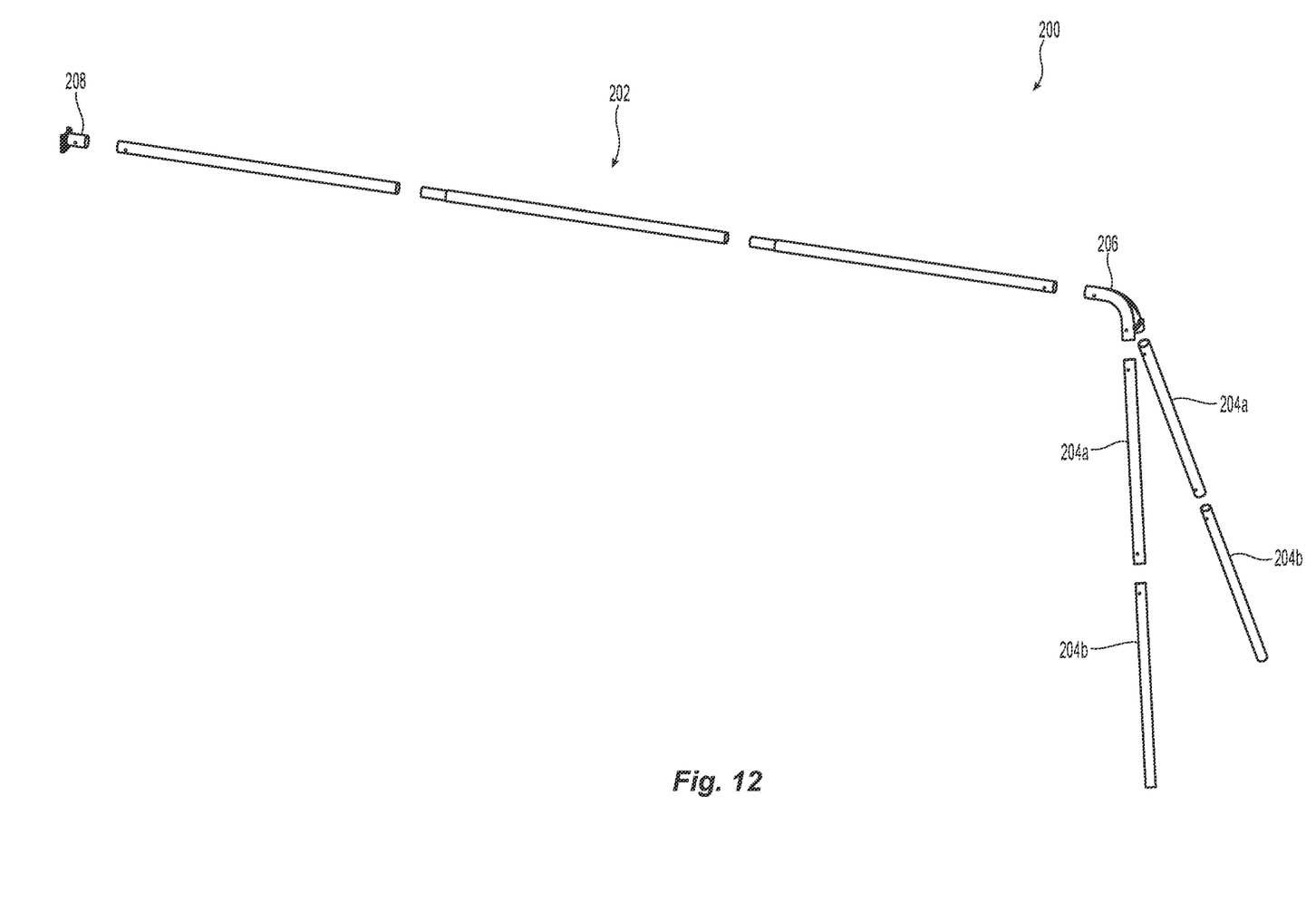
FIG. 12 is an exploded view of the non-permanent, collapsible frame in FIG. 11.
Figure 13:
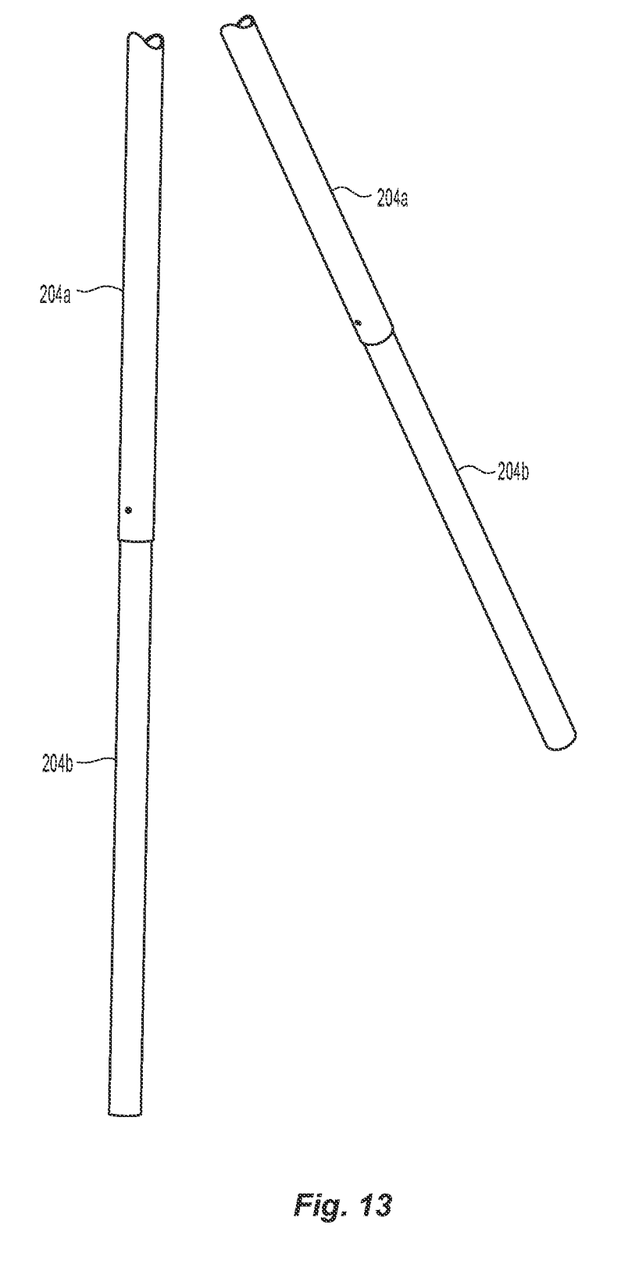
FIG. 13 is a close-up view of two legs to engage the connection member of the non-permanent, collapsible frame in FIG. 11.
Figure 14:
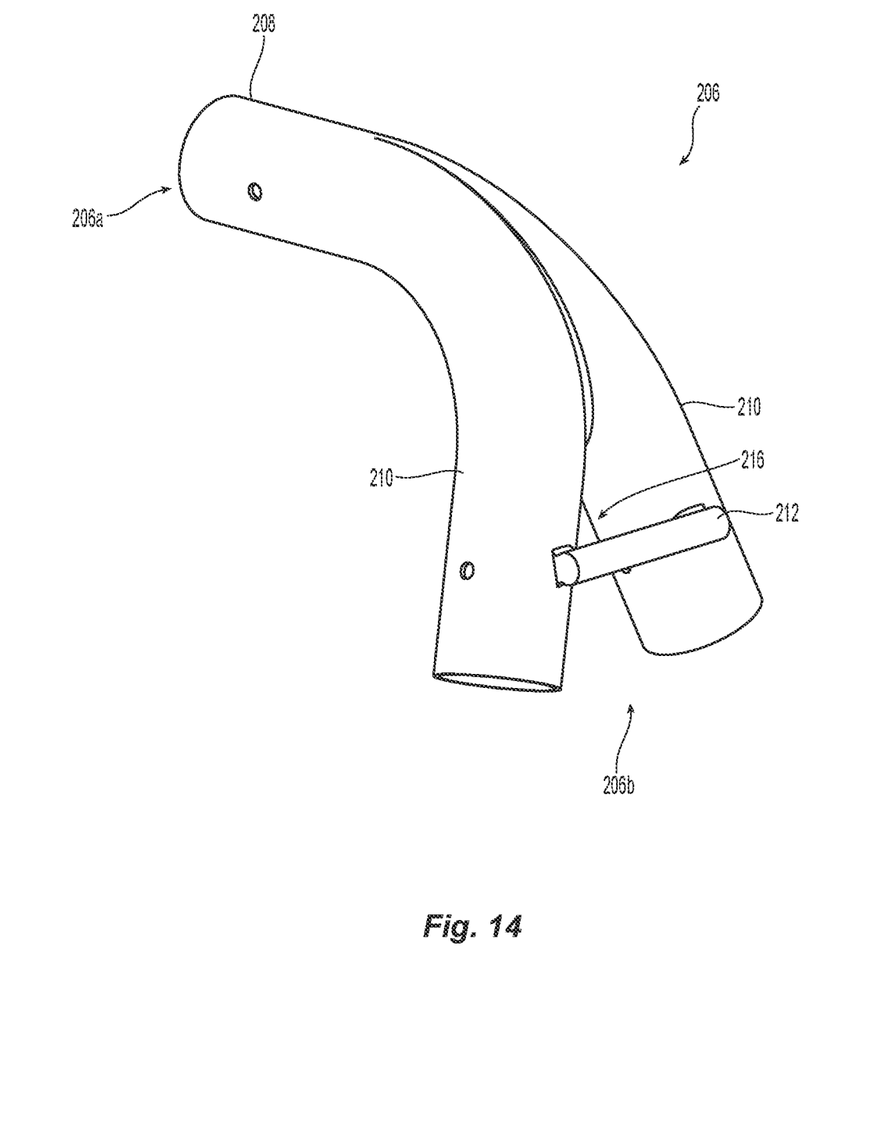
FIG. 14 is a perspective view of the connection member of the non-permanent, collapsible frame in FIG. 11.

The base 106 is preferably elongated and has at least two feet 114 on a bottom side 116. The base 106 may also be made from two sections 106a, 106b as illustrated in FIG. 8. One of the two sections 106a, 106b may be stored in the other (telescoping) or may be necked. If the base 106 has multiple sections, the two sections 106a, 106b should be secured to one another before the non-permanent, collapsible frame 100 is used. The base 106 preferably has openings 106c on opposing sides of the two sections 106a, 106b to allow for a spike 112 to be inserted into the openings 106c and into the ground or surface to assist in keeping the base 106 in place during use.

Towards the top end of one of the plurality of sections 104a of the vertical support bar 104 is a receiver 120 to receive an end of the overhead bar 102. The receiver 120 preferably has the same configuration as that of the overhead bar 102 (circular, round, oval, square, rectangular, etc.). The overhead bar 102 is preferably secured to the receiver 120 in one of the manners disclosed above to prevent the two items from separating from one another during use. Also, while the receiver 120 is directly attached to one of the plurality of sections 104a of the vertical support bar 104, it is possible that the receiver 120 could be a separate portion and be removably attached to the vertical support bar 104. Additionally, the overhead bar 102 could be disposed within the receiver 120 or the receiver 120 could be disposed within the overhead bar 102.

Figure 1:
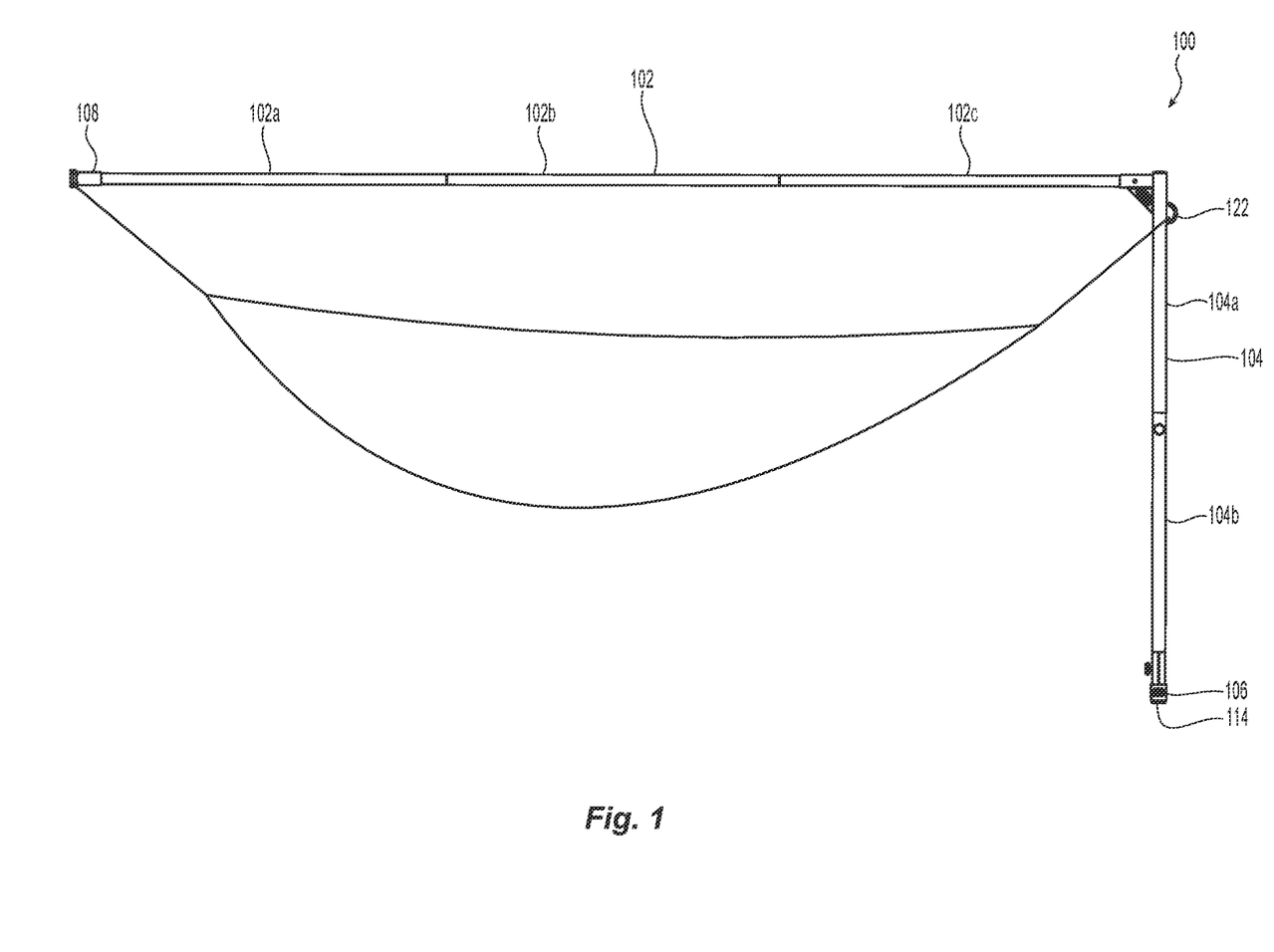
FIG. 1 is a side view of one embodiment of a non-permanent, collapsible frame for supporting a hammock according to the present invention with the representation of a hammock attached thereto.
Figure 2:
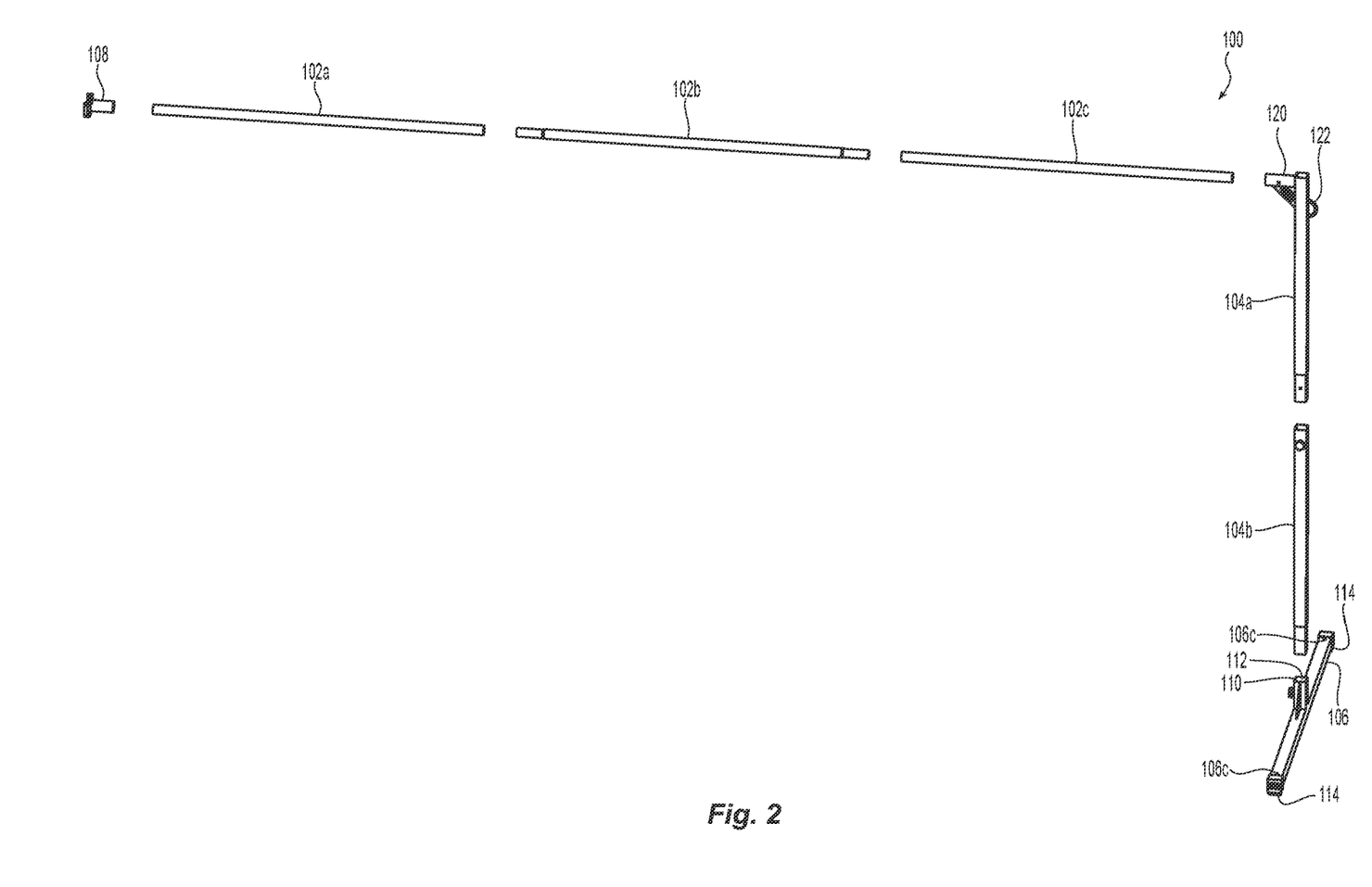
FIG. 2 is an exploded view of the non-permanent, collapsible frame in FIG. 1.
Figure 3:
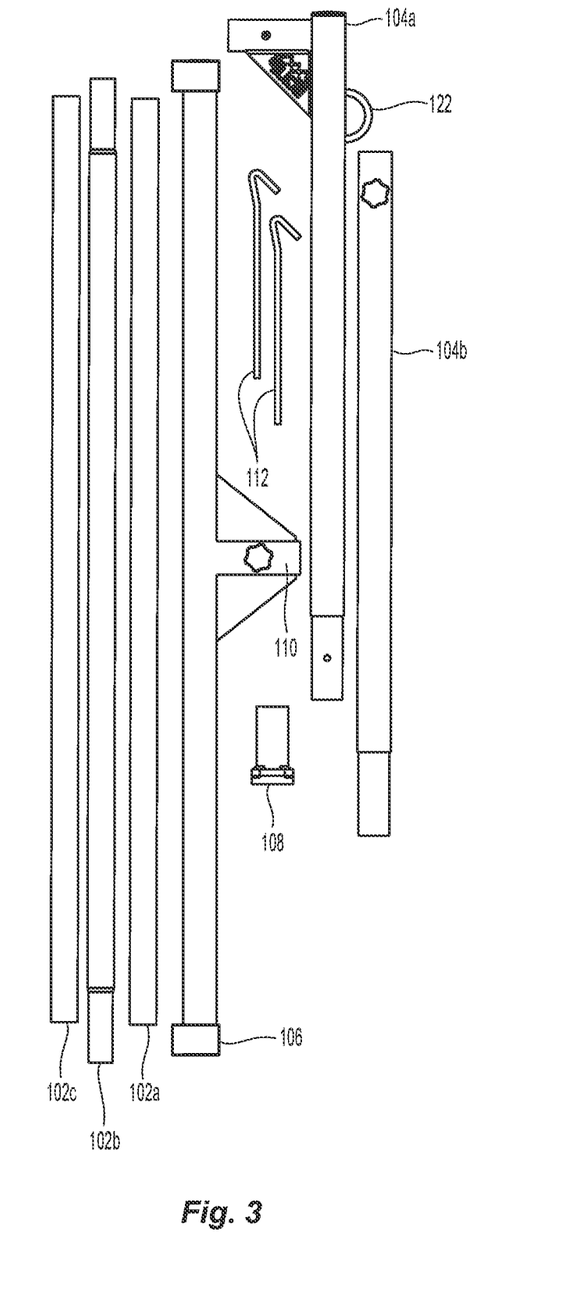
FIG. 3 is an exploded, assembled view of the non-permanent, collapsible frame in FIG. 2 that is ready to be transported.
Figure 4:
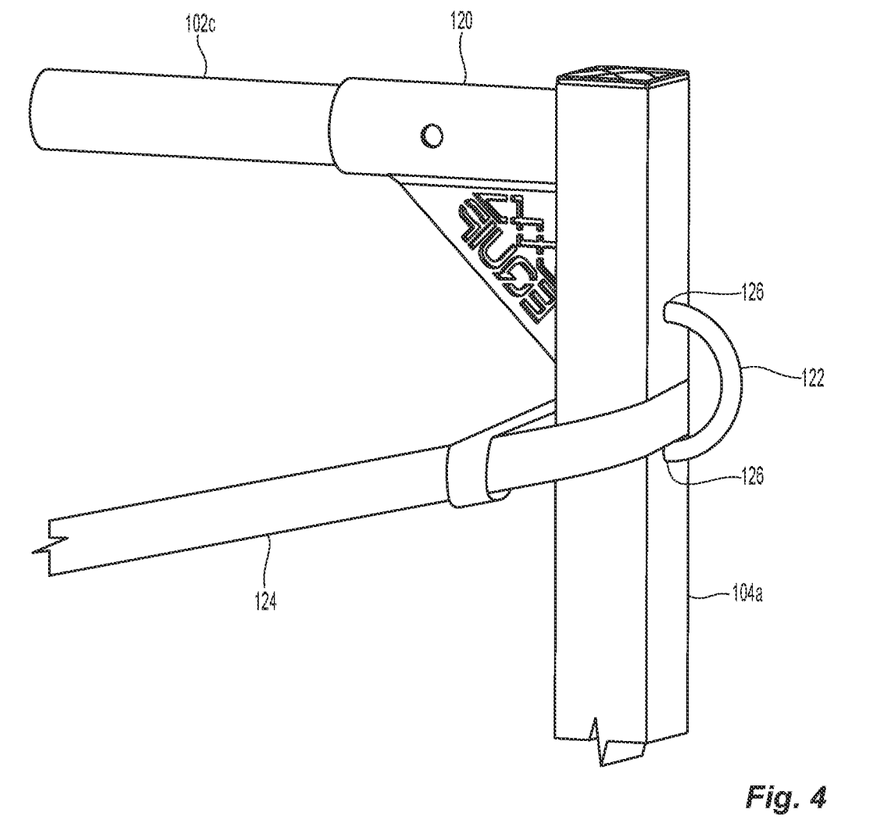
FIG. 4 is a perspective view of the top end of the vertical support bar of the non-permanent, collapsible frame in FIG. 1.
Figure 5:
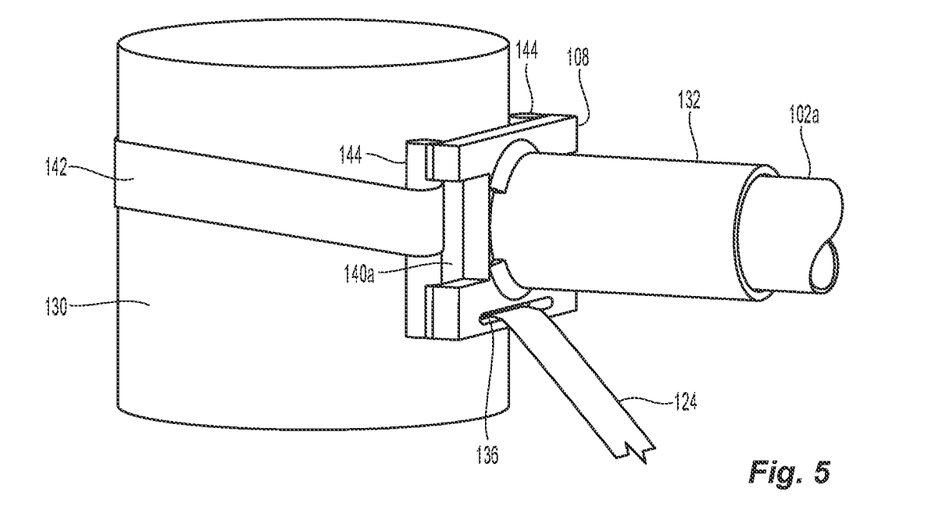
FIG. 5 is a perspective view of the termination plate of the non-permanent, collapsible frame in FIG. 1 attached to a support structure.

At the top end of one of the plurality of sections 104a of the vertical support bar 104 is also a support 122 to receive a hammock suspension device 124. The hammock suspension device 124 could be a rope, webbing, or other item that is used to secure a hammock. As illustrated in FIGS. 2-4, the support 122 is a curved bar that is attached at two ends 126 at the top end of one of the plurality of sections 104a of the vertical support bar 104. The hammock suspension device 124 is threaded through the space between the curved bar 122 and the vertical support bar 104 to support one end of the hammock. See FIG. 4.

Illustrated in FIGS. 5-9 is one embodiment of a termination plate 108 according to the present invention. The termination plate 108 is attachable to a support structure 130, which is typically a tree, but could be any one of a number of objects, e.g., a fence post, a telephone pole, etc. See FIG. 5. The termination plate 108 has a receiver 132 to receive a second end of the overhead bar 102. The receiver 132 and the overhead bar 102 can be dimensioned such that the second end of the overhead bar 102 can fit within the receiver 132 or it can fit around the receiver 132. Again, the receiver 132 will have the same cross section configuration as the overhead bar 102, but while that is preferred, it is not critical. The receiver 132 may have a hole or other opening 134 to allow for securing the overhead bar 102 to the receiver 132. There may also be multiple openings 134 to allow for snap buttons or pins to be inserted through the receiver 132 and the overhead bar 102.

The termination plate 108 has an opening or a slot 136 for a second hammock suspension device 124. The opening 136 is preferably at the bottom of the termination plate 108 so as not to cover any other portions of the termination plate 108 during use. Additionally, the opening 136 is illustrated as being completely enclosed by portions of the termination plate 108 but it is possible to have a configuration so that the opening 136 is not completely enclosed.

Figure 6:
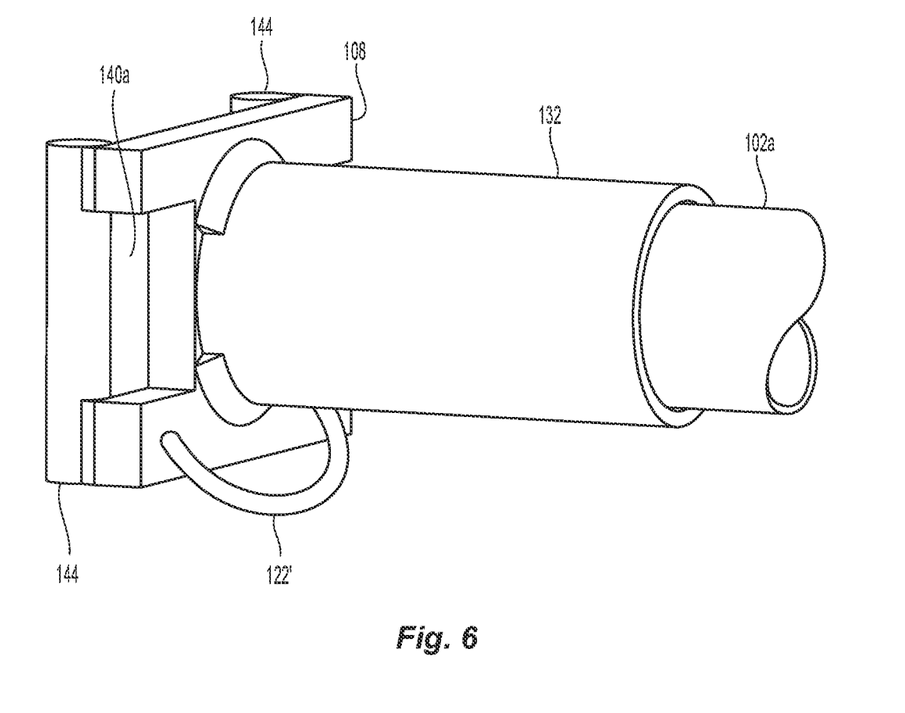
FIG. 6 is a front perspective view of another embodiment of the termination plate with an alternative support.
Figure 7:
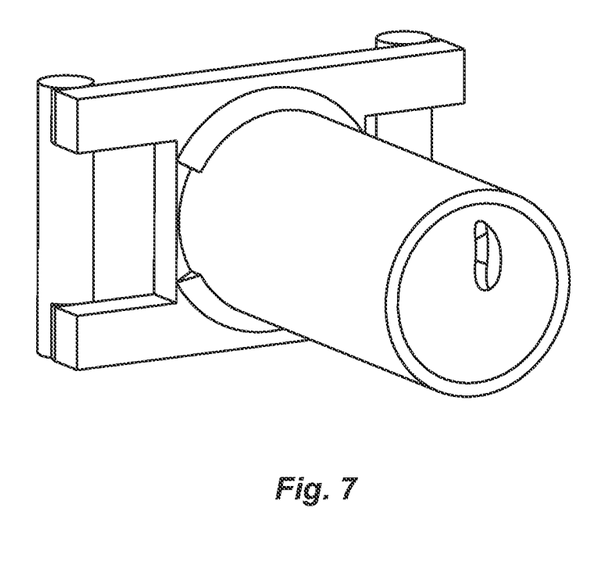
FIG. 7 is a front perspective view of another embodiment of a termination plate according to the present invention.

An alternative embodiment of a termination plate is illustrated in FIG. 6 that does not have the opening 136, but rather has a loop 122' to receive the second hammock suspension device 124. FIG. 7 illustrates yet another embodiment of a termination plate that does not have an opening or a loop for a hammock suspension device. For this termination plate, the hammock suspension device would be used with the support structure independent of the termination plate.

Returning to FIG. 8, the termination plate 108 has two openings or slots 140a, 140b for a termination plate suspension device 142. The termination plate suspension device 142 can be a rope, webbing, etc. to removably attach the termination plate 108 to the support structure 130. The termination plate suspension device 142 can be looped through slot 140a and behind the termination plate 108 and out through the second slot 140b to be wrapped around the support structure 130. There should be space behind the termination plate 108 and receiver 132 to allow the termination plate suspension device 142 to be moved relative to the termination plate 108. As best illustrated in FIG. 8, there may be rearward extensions 144 to provide for spacing behind the receiver 132 of the termination plate 108. The rearward extensions 144 are illustrated as being round in cross section. These extensions can take different forms and shapes and may be integrally make with the remainder of the termination plate or added subsequently.

A second embodiment of a non-permanent, collapsible frame for supporting a hammock 200 is illustrated in FIGS. 11-14. The non-permanent, collapsible frame 200 is generally comprised of four elements. There is the overhead bar 202, two vertical support bars 204, a connection member 206, and the termination plate 208. In this embodiment a non-permanent, collapsible frame 200, the overhead bar 202 and the termination plate 208 are preferably the same as in the previous embodiment. The two vertical support bars 204 (or legs), and the connection member 206 provide for a different support at the other end of the overhead bar 202 from the termination plate 208. The two vertical support bars 204 (or legs) are preferably comprised of at least two portions 204a, 204b. See FIG. 12. They too can be connected to each other as with the vertical support bar 104 discussed above. There is no need for a base, but one could be used if so desired.

The connection member 206 has a receiver 208 at a first end 206a and there are two receivers 210 at the second end 206b. The two vertical support bars 204 (or legs) are connected to the connection member 206 at the second end 206b with the two vertical support bars 204 (or legs) being inserted into a respective one of the receivers 210. As noted above, it is also possible that the two vertical support bars 204 (or legs) are on the outside of the receivers 210 of the connection member 206. The overhead bar 202 is inserted into (or around the outside) of the receiver 208. The non-permanent, collapsible frame 200 has a support 212 for a hammock suspension device 124. In this case, the support 212 is a bar that is attached at opposite ends thereof to the two receivers 210. There is a space 216 between the two receivers 210 and the support 212 spans at least a portion thereof. See FIG. 13.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A non-permanent, collapsible frame for supporting a hammock comprising: an overhead bar having a first end and a second end; a single vertical support bar connected to the second end of the overhead bar and the single vertical support bar directly supporting a first end of the hammock; a termination plate attachable to a support structure, the termination plate connected to the first end of the overhead bar and directly supporting a second end of the hammock; and a base, the base to be placed on a surface or ground, to receive and support a portion of the single vertical support bar.

2. The non-permanent, collapsible frame according to claim 1, wherein the overhead bar and the single vertical support bar comprise a plurality of sections.

3. The non-permanent, collapsible frame according to claim 2, wherein the plurality of sections of the overhead bar are removably attachable to each other and the plurality of sections of the vertical support bar are removably attachable to each other.

4. The non-permanent, collapsible frame according to claim 1, wherein the base comprises at least two sections, the two sections movable relative to one another.

5. The non-permanent, collapsible frame according to claim 1, wherein the termination plate includes a receiver for the first end of the overhead bar, a first opening for a hammock suspension device, and a second opening for a termination plate suspension device.

6. The non-permanent, collapsible frame according to claim 1, wherein the single vertical support bar has a receiver for the second end of the overhead bar.

7. The non-permanent, collapsible frame according to claim 1, wherein the single vertical support bar has a support for a hammock suspension device.

8. The non-permanent, collapsible frame according to claim 1, wherein the base includes a receiver for receiving a portion of the single vertical support bar.

9. A non-permanent, collapsible frame for supporting a hammock comprising: a termination plate attachable to a support structure; a base having a single vertical support bar extending upward from the base; and an overhead bar extending between the termination plate and the vertical support bar, the overhead bar removably attachable to the vertical support bar and the termination plate and the termination plate and the vertical support bar each directly supporting one of two ends of the hammock.

10. A non-permanent, collapsible frame for supporting a hammock consisting of: an overhead bar having a first end and a second end; a single vertical support bar connected to the second end of the overhead bar and the single vertical support bar having a support to receive a first hammock suspension device; a termination plate attachable to a support structure, the termination plate connected to the first end of the overhead bar, and having a first opening for a second hammock suspension device and a first opening for a termination plate suspension device; and a base to receive and support the single vertical support bar.

* * * * *